United States Patent
Sakashita (10) Patent No.: US 7,745,869 B2
(45) Date of Patent: Jun. 29, 2010

(54) THIN FILM CAPACITANCE ELEMENT COMPOSITION, HIGH PERMITTIVITY INSULATION FILM, THIN FILM CAPACITANCE ELEMENT, THIN FILM MULTILAYER CAPACITOR AND PRODUCTION METHOD OF THIN FILM CAPACITANCE ELEMENT

(75) Inventor: Yukio Sakashita, Tokyo (JP)

(73) Assignee: TDK Corporation, Tokyo (JP)

( * ) Notice: Subject to any disclaimer, the term of this patent is extended or adjusted under 35 U.S.C. 154(b) by 971 days.

(21) Appl. No.: 10/542,956

(22) PCT Filed: Jan. 16, 2004

(86) PCT No.: PCT/JP2004/000265
§ 371 (c)(1),
(2), (4) Date: Apr. 24, 2006

(87) PCT Pub. No.: WO2004/065668
PCT Pub. Date: Aug. 5, 2004

(65) Prior Publication Data
US 2006/0249811 A1    Nov. 9, 2006

(30) Foreign Application Priority Data
Jan. 21, 2003  (JP) .............................. 2003-012088

(51) Int. Cl.
*H01L 27/108* (2006.01)
*H01L 29/76* (2006.01)
*H01L 29/94* (2006.01)
*H01L 31/119* (2006.01)
*H01L 29/00* (2006.01)

(52) U.S. Cl. ................ 257/310; 257/532; 257/535; 257/E39.01; 257/E33.01

(58) Field of Classification Search ................. 257/310, 257/532, 535, E39.001, E39.01, E33.01
See application file for complete search history.

(56) References Cited

U.S. PATENT DOCUMENTS 6,303,391 B1 * 10/2001 Hintermaier et al. ........... 438/3

(Continued)

FOREIGN PATENT DOCUMENTS

EP     0 877 100 A1    11/1998

(Continued)

OTHER PUBLICATIONS

T. Kojima et al., "Novel Candidate of c-axis-oriented BLSF Thin Films for High-Capacitance Condenser," Mat. Res. Soc. Symp. Proc., 2003, vol. 748, pp. 451-456.

(Continued)

*Primary Examiner*—David S Blum
(74) *Attorney, Agent, or Firm*—Oliff & Berridge, PLC (57) ABSTRACT

A thin film capacitance element composition, wherein a bismuth layer compound having a c-axis oriented vertically with respect to a substrate surface is expressed by a composition formula of $(Bi_2O_2)^{2+}(A_{m-1}B_mO_{3m+1})^{2-}$ or $Bi_2A_{m-1}B_mO_{3m+3}$, wherein "m" is an even number, "A" is at least one element selected from Na, K, Pb, Ba, Sr, Ca and Bi, and "B" is at least one element selected from Fe, Co, Cr, Ga, Ti, Nb, Ta, Sb, V, Mo and W; and Bi in the bismuth layer compound is excessively included with respect to the composition formula of $(Bi_2O_2)^{2+}(A_{m-1}B_mO_{3m+1})^{2-}$ or $Bi_2A_{m-1}B_mO_{3m+3}$, and the excessive content of Bi is in a range of $0<Bi<0.5 \times m$ mol in of Bi.

13 Claims, 5 Drawing Sheets

U.S. PATENT DOCUMENTS 6,323,104 B1 * 11/2001 Trivedi .................. 438/424

FOREIGN PATENT DOCUMENTS

| JP | A 56-144523 | 11/1981 |
| JP | A 05-335173 | 12/1993 |
| JP | A 05-335174 | 12/1993 |
| JP | A 08-253324 | 10/1996 |
| JP | A 11-049600 | 2/1999 |
| JP | A 11-214245 | 8/1999 |
| JP | A 2000-124056 | 4/2000 |
| JP | A 2002-321974 | 11/2002 |
| WO | WO 03/021606 A1 | 3/2003 |

OTHER PUBLICATIONS

The 27th Annual Cocoa Beach Conference & Exposition on Advance Ceramics & Composites, Jan. 26-31, 2003.

The 5th International Meeting of Pacific Rim Ceramic Societies Incorporating the 16th Fall Meeting of the Ceramic Society of Japan, Sep. 29 to Oct. 2, 2003, p. 35.

The 5th International Meeting of Pacific Rim Ceramic Societies Incorporating the 16th Fall Meeting of the Ceramic Society of Japan, 2003, p. 111.

MRS 2002 Program Exhibit Guide, Dec. 2-6, 2002, p. 211.

Extended Abstracts (The 50th Spring Meeting, 2003); the Japan Society of Applied Physics and Related Societies, No. 2, Mar. 27-30, 2003, p. 596.

Extend Abstracts (The 64th Autumn Meeting, 2003); The Japan Society of Applied Physics, Aug. 23, 2003 to Sep. 2, 2003, No. 2, p. 493.

L. Nibou et al., Chemical Fabrication $SrBi_4 Ti_4 O_{15}$ Thin Films, Journal of the European Ceramic Society, 1999, vol. 19, pp. 1383 to 1386.

* cited by examiner

THIN FILM CAPACITANCE ELEMENT COMPOSITION, HIGH PERMITTIVITY INSULATION FILM, THIN FILM CAPACITANCE ELEMENT, THIN FILM MULTILAYER CAPACITOR AND PRODUCTION METHOD OF THIN FILM CAPACITANCE ELEMENT

TECHNICAL FIELD

The present invention relates to a thin film capacitance element composition, a high permittivity insulation film, a thin film capacitance element, a thin film multilayer capacitor and a production method of the thin film capacitance element.

BACKGROUND ART

In recent years, in the field of electronic devices, there have been demands for a furthermore compact and higher performance capacitor element as an essential circuit element in a variety of electronic circuits along with electronic circuits becoming higher in density and more highly integrated.

For example, a thin film capacitor using a single-layer dielectric thin film is behind in making a compact integrated circuit with a transistor or other active element, which has bean a factor of hindering realization of an ultra-high integrated circuit. It was a low permittivity of a dielectric material to be used that has hindered attaining of a compact thin film capacitor. Accordingly, it is significant to use a dielectric material having a high permittivity to realize a more compact thin film capacitor with a high capacitance.

Also, in recent years, a conventional multilayer film of $SiO_2$ and $Si_3N_4$ has become hard to respond to a capacitor element for a DRAM of the next generation (gigabit generation) in terms of capacitance density, and a material system having a higher permittivity has gathered attention. In such a material system, an application of TaOx ($\epsilon$=30 or smaller) has been mainly studied but development of other materials comes to be actively pursued.

On the other hand, as a dielectric material having a relatively high permittivity, (Ba, Sr)$TiO_3$ (BST) and Pb(Mg$_{1/3}$Nb$_{2/3}$)$O_3$ (PMN) are known.

It can be considered that it is possible to attain a compact body when a thin film capacitance element is composed of a dielectric material of this kind.

However, when using dielectric materials of this kind, the permittivity declined as the dielectric film became thinner in some cases. Also, a leakage property and a breakdown voltage were deteriorated due to apertures generated on the dielectric film as the film became thinner in some cases. Furthermore, the dielectric film to be formed had poor surface smoothness and, moreover, it was liable that the change rate of permittivity against temperature declined. Note that due to a large effect by lead compounds, such as PMN, on the environment, a high capacitance capacitor not containing lead has bean desired.

On the other hand, to realize a more compact multilayer ceramic capacitor with a larger capacitance, it is desired that a thickness of one dielectric layer is made as thin as possible (a thinner layer) and the number of dielectric layers at a predetermined size is increased as much as possible (an increase of stacked layers).

A multilayer ceramic capacitor is produced by a sheet method or printing method. The sheet method is a method of forming a dielectric green sheet layer on a carrier film by using a dielectric layer paste by the doctor blade method, etc., printing an internal electrode layer paste to be a predetermined pattern thereon, then, releasing them one by one and stacking the same. The printing method is a method of alternately printing a dielectric layer paste and an internal electrode layer paste for a plurality of times on a carrier film, for example, by using the screen printing method, then, removing the carrier film. However, for example, when producing a multilayer ceramic capacitor by the sheet method, the dielectric layer could not be made thinner than ceramic material powder. Furthermore, it was difficult to make the dielectric layer thin, for example, as 2 μm or thinner because of problems of short-circuiting and breaking of internal electrode, etc. due to a defective dielectric layer. Also, when a thickness of one dielectric layer was made thinner, the number of stacked layers was also limited. Note that the same problem remained in the case of producing a multilayer ceramic capacitor by the printing method.

Due to the above reasons, there was a limit in making the multilayer ceramic capacitor more compact and higher in capacitance. Thus, a variety of proposals have been made to solve the problem (for example, the patent article 1: the Japanese Patent Publication No. 2000-124056, the patent article 2: the Japanese Patent Publication No. 11-214245, the patent article 3: the Japanese Patent Publication No. 56-144523, the patent article 4: the Japanese Patent Publication No. 5-335173 and the patent article 5: the Japanese Patent Publication No. 5-335174, etc.).

In these publications, methods of producing a multilayer ceramic capacitor formed by alternately stacking dielectric thin films and electrode thin films by using a variety of thin film forming method, such as the CVD method, evaporation method and sputtering method are disclosed.

However, a dielectric thin film formed by the methods described in the publications had poor surface smoothness, and short-circuiting of electrodes arose when stacking too much, so that those having 12 or 13 stacked layers or so were able to be produced at most. Therefore, even when the capacitor could be made compact, a higher capacitance could not be attained.

Note that as described in the non-patent article 1 ["Particle Orientation of Ferroelectric Ceramic having Bismuth Layer Structure and Application Thereof to Piezoelectric and Pyroelectric Material" by Tadashi Takenaka, pp. 23 to 77 in chapter 3 of Kyoto University Doctor of Engineering Thesis (1984)], it is known that a bulk bismuth layer compound dielectric obtained by the sintering method is composed of a composition expressed by the composition formula of $(Bi_2O_2)^{2+}(A_{m-1}B_mO_{3m+1})^{2-}$ or $Bi_2A_{m-1}B_mO_{3m+3}$, wherein "m" is a positive number from 1 to 8, "A" is at least one element selected from Na, K, Pb, Ba, Sr, Ca and Bi, and "B" is at least one element selected from Fe, Co, Cr, Ga, Ti, Nb, Ta, Sb, V, Mo and W.

However, in this article, nothing was disclosed on under what condition (for example, a relationship of a substrate surface and a c-axis orientation degree of a compound) when making the composition expressed by the above composition formula thinner (for example 1 μm or thinner), a thin film capable of giving a relatively high permittivity and a low loss, having an excellent leakage property, improved breakdown voltage, excellent temperature characteristics of permittivity, and excellent surface smoothness could be obtained.

The present inventors have developed a thin film capacitance element composition disclosed in the patent article 6 (PCT/JP02/08574) and filed before. As a result of carrying on further experiments, they found that the c-axis orientation degree of the compound can be still improved by making Bi contained in excess of a stoichiometric composition of the bismuth layer compound, and completed the present invention.

Note that a thin film composed of the thin film capacitance element composition described in the patent article 6 can be formed by a variety of thin film forming methods, such as the CVD method, evaporation method and sputtering method. But particularly when forming by a solution method (the sol-gel method and MOD (Metal-Organic Deposition) method), the c-axis orientation degree was hard to be improved. It was because firing for crystallization was performed after forming a coating film to be a certain film thickness on a substrate, so that it was easily affected by the substrate and the c-axis orientation was hard to be improved regardless of the direction of the orientation of the substrate.

Also, the non-patent article 2 [2001 Journal of Applied Physics Vol. 40 (2001) pp. 2977 to 2982, Part 1, No. 4B, April 2001] reports that the c-axis orientation degree can be improved by adding Bi excessively in a dielectric thin film of $(Bi,La)_4Ti_3O_{12}$. However, this article only discloses a bismuth layer compound expressed by a composition formula $(Bi_2O_2)^{2+}(A_{m-1}B_mO_{3m+1})^{2-}$ or $Bi_2A_{m-1}B_mO_{3m+3}$, wherein "m" is an odd number. Also, in this article, the excessive adding quantity of Bi is low as 2.5 to 7.5 mol % (0.4 mol or less with respect to the stoichiometric composition), which was proved to be insufficient to improve the leakage current resistance characteristic according to an experiment by the present inventors.

DISCLOSURE OF THE INVENTION

The present invention was made in consideration of the above circumstances and has as an object thereof to provide a thin film capacitance element composition, high permittivity insulation film, thin film capacitance element, thin film multilayer capacitor and a production method of the thin film capacitance element, wherein the c-axis orientation degree is high and, particularly, the leakage current resistance characteristic is excellent. Another object of the present invention is to produce a thin film capacitance element having a high c-axis orientation degree and excellent leakage current resistance characteristic particularly by forming by a solution method.

The present inventors have been committed themselves to study a material and crystal structure of a dielectric thin film to be used for a capacitor, found that by using a bismuth layer compound having a specific composition and making a c-axis ([001] orientation) of the bismuth layer compound vertical with respect to the substrate surface when composing the dielectric thin film as a thin film capacitor element composition, that is, by forming a c-axis orientation film (a thin film normal line is in parallel with the c-axis) of the bismuth layer compound on the substrata surface, it was possible to provide a thin film capacitance element compound capable of giving a relatively high permittivity and a low loss (tan δ is low) and having an excellent leakage property, improved breakdown voltage, temperature characteristics of the permittivity, and surface smoothness even when made to be thin; and a thin film capacitance element using the same. Also, it was found that by using such a thin film capacitance element composition as a dielectric thin film, the number of stacked layers could be improved and a compact thin film multilayer capacitor capable of giving a relatively high capacitance could be provided, and the present invention was completed. Furthermore, it was found that by using such a composition as a high permittivity insulation film, application to other use objects than a thin film capacitance element also became possible, and the present invention was completed.

Furthermore, the present inventors found that, by making Bi of the bismuth layer compound contained excessively in the composition by a predetermined excessive content with respect to the stoichiometric composition of the bismuth layer compound, it was possible to improve the c-axis orientation degree and leakage current resistance characteristics, and completed the present invention.

Namely, in a thin film capacitance element composition according to a first aspect of the present invention:

a bismuth layer compound having a c-axis oriented vertically with respect to a substrate surface is expressed by a composition formula of $(Bi_2O_2)^{2+}(A_{m-1}B_mO_{3m+1})^{2-}$ or $Bi_2A_{m-1}B_mO_{3m+3}$, wherein "m" is an even number, "A" is at least one element selected from Na, K, Pb, Ba, Sr, Ca and Bi, and "B" is at least one element selected from Fe, Co, Cr, Ga, Ti, Nb, Ta, Sb, V, Mo and W; and Bi in the bismuth layer compound is excessively included with respect to the composition formula of $(Bi_2O_2)^{2+}(A_{m-1}B_mO_{3m+1})^{2-}$ or $Bi_2A_{m-1}B_mO_{3m+3}$, and the excessive content of Bi is in a range of 0<Bi<0.5×m mol in terms of Bi.

In the first aspect of the present invention, an excessive content of the Bi is preferably in a range of $0.1 \leq Bi<0.5 \times m$ mol, more preferably $0.4 \leq Bi<0.5 \times m$ mol, and particularly preferably $0.4 \leq Bi<0.4 \times m$ mol in terms of Bi.

In the first aspect of the present invention, "m" in the composition formula of the bismuth layer compound is preferably any one of 2, 4, 6 and 8, and more preferably any one of 2 and 4. It is for making the production easier and improvement of the c-axis orientation degree easier.

In thin film capacitance element composition according to a second aspect of the present invention, a bismuth layer compound having a c-axis oriented vertically with respect to a substrate surface is expressed by a composition formula of $SrBi_4Ti_4O_{15}$ (m=4 in $Bi_2A_{m-1}B_mO_{3m+3}$); and Bi in the bismuth layer compound is excessively included with respect to the composition formula of $SrBi_4Ti_4O_{15}$, and the excessive content of Bi is in a range of 0<Bi<2.0 mol, preferably $0.1 \leq Bi<2.0$ mol, more preferably $0.4 \leq Bi<2.0$ mol, and particularly preferably $0.4 \leq Bi \leq 1.6$ mol in terms of Bi.

In a thin film capacitance element composition according to a third aspect of the present invention, a bismuth layer compound having a c-axis oriented vertically with respect to a substrate surface is expressed by a composition formula of $SrBi_4Ti_4O_{15}$; and Bi in the bismuth layer compound is excessively included with respect to the composition formula of $SrBi_4Ti_4O_{15}$, and when the excessive content of Bi is expressed by a mole ratio (Bi/Ti) against Ti, Bi/Ti is in a range of 1<Bi/Ti<1.5, preferably $1.1 \leq Bi/Ti<1.5$, more preferably $1.2 \leq Bi/Ti<1.5$, and particularly preferably $1.2 \leq Bi/Ti \leq 1.4$.

In a thin film capacitance element composition according to a fourth aspect of the present invention, a bismuth layer compound having a c-axis oriented vertically with respect to a substrate surface is expressed by a composition formula of $Sr_xCa_yBa_zBi_4Ti_4O_{15}$, x+y+z=1, $0 \leq x \leq 1$, $0 \leq y \leq 1$ and $0 \leq z \leq 1$; and Bi in the bismuth layer compound is excessively included with respect to the composition formula of $Sr_xCa_yBa_zBi_4Ti_4O_{15}$, and when the excessive content of Bi is expressed by a mole ratio (Bi/Ti) against Ti, Bi/Ti is in a range of 1<Bi/Ti<1.5, preferably $1.1 \leq Bi/Ti<1.5$, more preferably $1.2 \leq Si/Ti<1.5$, further preferably $1.2 \leq Bi/Ti<1.4$.

The "thin film" mentioned in the present invention means a film of a material having a thickness of several Å to several μm or so formed by a variety of thin film forming methods and excludes a bulk (block) of a thick film having a thickness of several hundreds of μm or thicker formed by the sintering method, the thin film includes a continuous film which continuously covers a predetermined region and a discontinuous film which covers discontinuously at any intervals. The thin film may be formed at a part of or allover a substrate.

In the present invention, preferably, a rare earth element (at least one selected from Sc, Y, La, Ce, Pr, Nd, Pm, Sm, Eu, Gd, Tb, Dy, Ho, Er, Tm, Yb and Lu) is furthermore included.

When the rare earth element is included, the leakage property can become still superior.

In the present invention, it is particularly preferable that the c-axis of the bismuth layer compound is oriented by 100% and being vertical with respect to the substrate, that is the c-axis orientation degree of the bismuth layer compound is 100%, but the c-axis orientation degree does not have to always be 100%.

The c-axis orientation degree of the bismuth layer compound with respect to the substrate surface is preferably 80% or more, more preferably 90% or more and particularly preferably 95% or more. By improving the c-axis orientation degree, effects of the present invention is enhanced.

The thin film capacitance element composition according to the present invention has a relatively high permittivity (for example, 100 or higher), a low loss (tan δ is 0.02 or lower), excellent leakage resistance characteristics (for example, the leakage current measured at electric field intensity of 50 kV/cm is $1 \times 10^{-7}$ A/cm$^2$ or lower), and improved breakdown voltage (for example, 1000 kV/cm or higher); and the thin film capacitance element composition according to the present invention is capable of giving a relatively high permittivity when made to be thin and, moreover, having preferable surface smoothness, so that it is possible to increase the number of stacked layers of dielectric thin films as the thin film capacitance element composition. Accordingly, it is also possible to provide a thin film multilayer capacitor having a high capacitance and compact body, when the thin film capacitance element composition is used.

Furthermore, the thin film capacitance element composition and thin film capacitance element according to the present invention have excellent frequency characteristics (for example, a ratio of a permittivity value at a high frequency region of 1 MHz and that at a low frequency region of 1 kHz under a specific temperature is 0.9 to 1.1 in an absolute value) and excellent voltage characteristics (for example, a ratio of a permittivity value at a measurement voltage of 0.1V and that at a measurement voltage of 5V under a specific frequency is 0.9 to 1.1 in an absolute value).

Furthermore, the thin film capacitance element composition according to the present invention has excellent temperature characteristics of the capacitance (an average change rate of the capacitance against temperature in a range of at least −55 to +150° C. is within ±500 ppm/° C., and preferably within ±300 ppm/° C. when the reference temperature is 25° C.).

The thin film capacitor element in not particularly limited and a capacitor having a conductor-insulator-conductor structure (for example, a single-layer thin film capacitor and multilayer thin film capacitor) and a capacitor (for example, for a DRAM, etc.) may be mentioned.

The thin film capacitor element composition is not particularly limited and a capacitor dielectric thin film composition, etc. may be mentioned The high permittivity insulation film according to the present invention is composed of a composition having the same composition as that of the thin film capacitor element composition according to the present invention. The high permittivity insulation film according to the present invention may be used, for example, as a gate insulation film of a semiconductor device, and an intermediate insulation film between a gate electrode and a floating gate, etc. other than the thin film dielectric film of a thin film capacitor element or a capacitor.

In a thin film capacitance element according to the present invention, a lower portion electrode, dielectric thin film and an upper portion electrode are successively formed on a substrate, wherein the dielectric film is composed of the thin film capacitance element composition as set forth in any of the above.

Preferably, a thickness of the dielectric thin film is 1 to 1000 nm, and more preferably 10 to 500 nm. When the thickness is in the ranges, effects of the present invention are enhanced.

In a thin film multilayer capacitor according to the present invention, a plurality of dielectric thin films and internal electrode thin films are alternately stacked on a substrate, wherein the dielectric thin film is composed of the thin film capacitance element composition as set forth in any one of the above.

Preferably, a thickness of the dielectric thin film is 1 to 1000 nm, and more preferably 10 to 500 mm. When the thickness is in the ranges, effects of the present invention are enhanced.

A high permittivity insulation film according to the present invention includes a bismuth layer compound having a c-axis oriented vertically with respect to a substrate surface, wherein the bismuth layer compound is composed of the thin film capacitance element composition as set forth in any one of the above.

A production method of a thin film capacitance element according to the present invention comprises:

a coating step for coating a solution for forming the thin film capacitance element composition on a surface of the lower portion electrode, so that Bi in the bismuth layer compound becomes an excessive content, to form a coating film; and a firing step for firing the coating film on the lower portion electrode to form a dielectric thin film when forming the dielectric thin film on the lower portion electrode.

Preferably, after forming the coating film on a surface of the lower portion electrode, the coating film is dried, then, preliminary firing is performed on the coating film at a temperature of not crystallizing the coating film and, then, the coating film is fired.

Alternately, after drying the coating film, steps of forming still another coating film on the dried coating film and drying the coating film are repeated to obtain a coating film having a desired thickness and, then, the coating film is fired. Note that, in that case, after repeating the coating and drying for one or more times, preliminary firing and, then, firing may be performed.

Alternately, after drying and performing preliminary firing on the coating film, steps of forming still another coating film on the preliminarily fired coating film and drying and performing preliminary firing on the coating film are repeated to obtain a coating film having a desired thickness and, then, the coating film is fired. Note that it may be possible to eliminate the drying step, repeat the steps of coating and preliminary firing, and fire it after that.

Alternately, steps of drying the coating film, performing preliminary firing and, then, firing are repeated to obtain a coating film having a desired thickness. Note that, in that case, drying may be omitted when repeating the coating, preliminary firing and firing, or preliminary firing may be omitted when repeating the coating, drying and firing.

Preferably, a temperature of firing the coating film is 700 to 900° C., which is a temperature of crystallizing the coating film.

Preferably, a temperature of drying the coating film is from the room temperature (25° C.) to 400° C., more preferably 50° C. to 300° C.

Preferably, a temperature of performing preliminary firing on the coating film is 300 to 500° C.

Preferably, coating, drying and/or preliminary firing are repeated, so that a film thickness of the coating film before firing becomes 200 nm or thinner after firing. When the thickness of the coating film before firing is too thick, it is liable that a preferably crystallized c-axis oriented bismuth layer compound film is hard to be obtained. While, when it is too thin, the main firing has to be repeated for many times to obtain a desired thickness of a dielectric thin film and it is not economical Preferably, after forming the dielectric thin film, an upper portion electrode is ford on the dielectric thin film, and thermal processing is performed in pO$_2$=20 to 100% (oxen partial pressure) after that. A temperature in the thermal treatment is preferably 650 to 900° C.

In the production method of a capacitance element according to the present invention, even when a chemical solution method is applied, regardless of a direction of the orientation of the substrate, a thin film capacitance element comprising a dielectric thin film having a high c-axis orientation degree and excellent leakage current resistance characteristics can be extremely easily produced. Also, according to the production method of the present invention, a relatively thick dielectric thin film can be formed easily.

BRIEF DESCRIPTION OF DRAWINGS

Below, the present invention will be explained based on embodiments shown in drawings.

BEST MODE FOR CARRYING OUT THE INVENTION

First Embodiment

In the present embodiment, a thin film capacitor, wherein a dielectric thin film is formed by a single layer will be explained as an example of a thin film capacitance element.

Figure 1A:
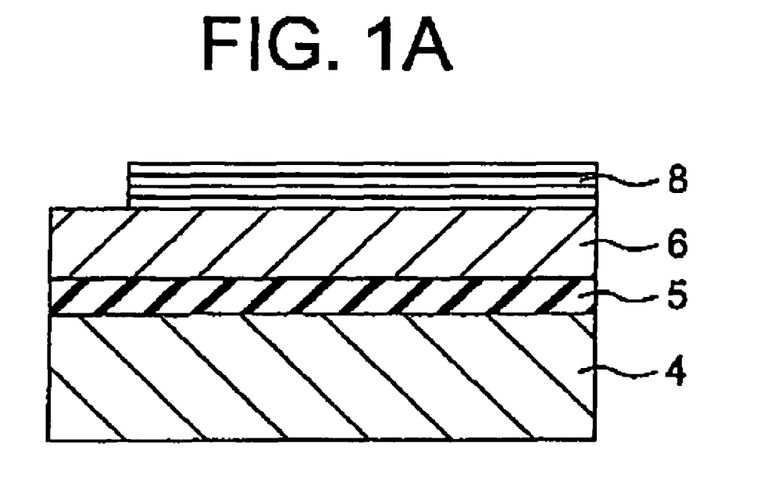
FIG. 1A and FIG. 1B are schematic sectional views showing production steps of a thin film capacitor according to an embodiment of the present invention.
Figure 1B:
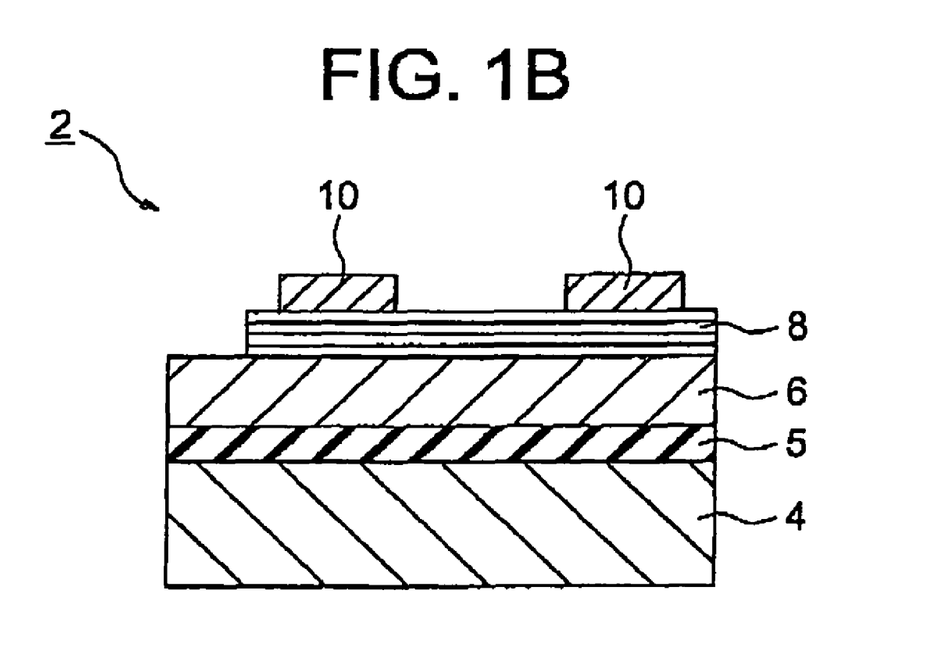

As shown in FIG. 1, a thin film capacitor 2 according to an embodiment of the present invention has a substrate 4, and a lower portion electrode thin film 6 is formed on the substrate 4 via an insulation layer 5. A dielectric thin film 8 is formed on the lower portion electrode thin film 6, and an upper portion electrode thin film 10 is formed thereon.

The substrate 4 is not particularly limited and formed by a single crystal having preferable lattice matching (for example, SrTiO$_3$ single crystal, MgO single crystal and LaAlO$_3$ single crystal, etc.), an amorphous material (for example, glass, fused silica and SiO$_2$/Si, etc.) and other materials (for example, ZrO$_2$/Si and CeO$_2$/Si, etc.). A thickness of the substrate 4 is not particularly limited and is, for example, 100 to 1000 µm or so.

In the present embodiment, a silicon single crystal substrate is used as the substrate 4, and the surface is formed with an insulation layer 5 formed by a thermally oxidized film (silicon oxide film), and the surface is formed with a lower portion electrode thin film 6. By using the present invention, a dielectric layer having c-axis orientation can be extremely easily produced naturally in the case of a lower portion electrode oriented in the [100] direction and even in the case of using an electrode of an amorphous, non-oriented or oriented in other direction than the [100], direction.

The lower portion electrode thin film 6 when using a single crystal having preferable lattice matching as the substrate 4 is preferably composed, for example, of CaRuO$_3$, SrRuO$_3$ and other conductive oxide or Pt, Ru and other precious metal and, more preferably, composed of a conductive oxide or precious metal oriented in the [100] direction. When using what oriented in the [100] direction as the substrate 4, it is possible to form a conductive or precious metal oriented in the [100] direction on the surface. By forming the lower portion electrode thin film 6 by a conductive or precious metal oriented in the [100] direction on the surface, the orientation in the [001] direction of the dielectric thin film 8 formed on the lower portion electrode thin film 6, that is the c-axis orientation, improves. A lower portion electrode thin film 6 as above can be produced by a normal thin film forming method. For example, in a physical deposition method, such as the sputtering method and pulse laser deposition method (PLD), a temperature of the substrate 4 to be formed with the lower portion electrode thin film 6 is set preferably at 300° C. or higher and more preferably at 500° C. or higher.

The lower portion electrode thin film 6 when using an amorphous material as the substrate 4 may be composed, for example, of ITO or other conductive glass. When using a single crystal having preferable lattice matching as the substrate 4, it is easy to form a lower portion electrode thin film 6 oriented in the [100] direction on its surface, consequently the c-axis orientation of the dielectric thin film 8 formed on the lower portion electrode thin film 6 easily improves. However, the dielectric thin film 8 with improved c-axis orientation can be formed also when using an amorphous material, such as glass, as the substrate 4. In that case, a film forming condition of the dielectric thin film 8 has to be optimized.

As other lower portion electrode thin film 6, for example, gold (Au), palladium (Pd) and silver (Ag) or other precious metal or an alloy of these, nickel (Ni), copper (Cu) or other base metal or an alloy of these may be used.

A thickness of the lower portion electrode thin film 6 is not particularly limited, but is preferably 10 to 1000 nm, and more preferably 50 to 200 nm or so.

The upper portion electrode thin film 10 may be composed of the same material as that of the lower portion electrode thin film 6 explained above. Also, a thickness thereof may be the same as that.

The dielectric thin film 8 is composed of the thin film capacitance element composition of the present invention and includes a bismuth layer compound expressed by the composition formula $(Bi_2O_2)^{2+}(A_{m-1}B_mO_{2m+1})^{2-}$ or $Bi_2A_{m-1}B_mO_{3m+3}$. Generally, a bismuth layer compound has a layer structure, wherein a perovskite layer having a series of perovskite lattice composed of (m−1) number of $ABO_3$ is sandwiched by a pair of Bi and O layers.

In the above formula, "m" is not particularly limited as far as it is an even number. When "m" is an even number, the reflection plane becomes parallel with the c plane, so that c-axis direction components of spontaneous polarization cancel each other on the boundary of the reflection plane and a polarization axis does not exist in the c-axis direction. Consequently, paraelectric property is maintained, the temperature characteristics of the permittivity improves and a low loss (low tan δ) is attained. Note that the permittivity tends to decline when "m" is an odd number, but a more preferable value than that in the conventional temperature compensating material can be obtained. Particularly, by making "m" large, the permittivity is expected to rise.

In the above formula, "A" is composed of at least one element selected from Na, K, Pb, Ba, Sr, Ca and Bi. Note that when the "A" is composed of two or more elements, a ratio of them may be any.

In the above formula, "B" is composed of at least one element selected from Fe, Co, Cr, Ga, Ti, Nb, Ta, Sb, V, Mo and W. Note that when the "B" is composed of two or more elements, a ratio of them may be any.

In the present embodiment, Bi of the bismuth layer compound is excessively contained with respect to the above composition formula $(Bi_2O_2)^{2+}(A_{m-1}B_mO_{3m+1})^{2-}$ or $Bi_2A_{m-1}B_mO_{3m+3}$, and the excessive content of Bi is in a range of 0<Bi<0.5×m mol in terms of Bi. Preferably the excessive content of Bi is in a range of 0.1≦Bi<0.5×m mol, more preferably 0.4≦Bi<0.5×m mol, and particularly preferably 0.4≦Bi≦0.4×m mol in terms of Bi.

For example, in the case of a bismuth layer compound having a composition formula of $SrBi_4Ti_4O_{15}$ or $Sr_xCa_yBa_zBi_4Ti_4O_{15}$ (note that x+y+z=1, 0≦x≦1, 0≦y≦1 and 0≦z≦1)), wherein the above "m" is 4, the excessive content of Bi is in a range of 0<Bi<2.0 (0.5×4 (m)) mol in terms of Bi.

Alternately, when expressing the excessive content of Bi by the mole ratio against Ti (Bi/Ti) with respect to their stoichiometric composition, Bi/Ti is in a range of 1<Bi/Ti<1.5, preferably 1.1≦Bi/Ti<1.5, more preferably 1.2≦Bi/Ti<1.5, and particularly preferably 1.2≦Bi/Ti≦1.4.

In the present embodiment, by making the bismuth contained excessively with respect to the stoichiometric composition, orientation to the [001] direction of the bismuth layer compound, that is, the c-axis orientation is improved. Namely, the dielectric thin film 8 is formed, so that the c-axis of the bismuth layer compound is oriented vertical with respect to the substrate 4.

In the present invention, it is particularly preferable that the c-axis orientation degree of the bismuth layer compound is 100%, but it does not always have to be 100%, and when preferably 80% or more, more preferably 90% or more and furthermore preferably 95% or more of the bismuth layer compound is c-axis oriented, it is sufficient. For example, when making the bismuth layer compound to be c-axis oriented by using a substrate 4 composed of an amorphous material, such as glass, the c-axis orientation degree of the bismuth layer compound may be preferably 80% or higher. Also, when making the bismuth layer compound to be c-axis oriented by using a later explained variety of thin film forming methods, the c-axis orientation degree of the bismuth layer compound may be preferably 90% or higher, and more preferably 95% or higher.

The c-axis orientation degree (F) of the bismuth layer compound here is obtained by F (%)=(P−P0)/(1−P0)×100 . . . (formula 1) when assuming that the c-axis diffraction intensity ratio of polycrystal having a completely random orientation is P0 and an actual c-axis diffraction intensity ratio of polycrystal is P. In the formula 1. "P" is a ratio of a total ΣI(001) of reflection intensity I(001) from a plane (001) and a total ΣI(hk1) of reflection intensity I(hk1) from respective crystal surfaces (hk1), that is ({ΣI(001)/ΣI(hk1)}, and it is also the same in "P0". Note that, in the formula 1, X-ray diffraction intensity P in the case of being oriented by 100% to the c-axis direction is assumed to be 1. Also, from the formula 1, F=0% in the case of corpletely random orientation (P=P0), and F=100% in the case of being oriented completely to the c-axis direction (P=1)).

Note that the c-axis of the bismuth layer compound means the direction of combining a pair of $(Bi_2O_2)^{2+}$ layers, that is the [001] direction. As a result that the bismuth layer compound is c-axis oriented, dielectric characteristics of the dielectric thin film 8 is fully brought out. Namely, the dielectric thin film 8 has a relatively high permittivity, a low loss, excellent leakage resistance characteristics, improved breakdown voltage, excellent temperature characteristics of permittivity and excellent surface smoothness. When the tan δ decreases, a loss Q (1/tan δ) value increases.

Note that the dielectric thin film 8 has an excellent leakage characteristics even when not including a rare earth element Re, which will be explained later on, but it is possible to furthermore improve the leak characteristics by Re substitution.

For example, in the dielectric thin film 8 not including a rare earth element Re, the leakage current measured at an electric field strength of 50 kV/m can be preferably $1×10^{-7}$ $A/cm^2$ or lower, and more preferably $5×10^{-8}$ $A/cm^2$ or lower.

On the other hand, in the dielectric thin film 8 including the rare earth element Re, the leakage current measured under the same condition can be preferably $5×10^{-5}$ $A/cm^2$ or lower, and more preferably $1×10^{-8}$ $A/cm^2$ or lower.

A thickness of the dielectric thin film 8 is preferably 1 to 1000 nm, and more preferably 1 to 500 nm in terms of attaining a high capacitance.

In the dielectric thin film 8, the permittivity at 25° C. (the room temperature) with a measurement frequency of 100 kHz (AC 20 mV) is preferably exceeding 100, and more preferably 150 or higher.

The dielectric thin film 8 as above can be formed by using a variety of thin film forming methods, such as a vacuum deposition method, high frequency sputtering method, pulse laser deposition (PLD) method, MOCVD (metal organic chemical vapor deposition) method and sol-gel method.

In the present embodiment, the dielectric thin film 8 can be produced particularly by the method described below.

Figure 2:
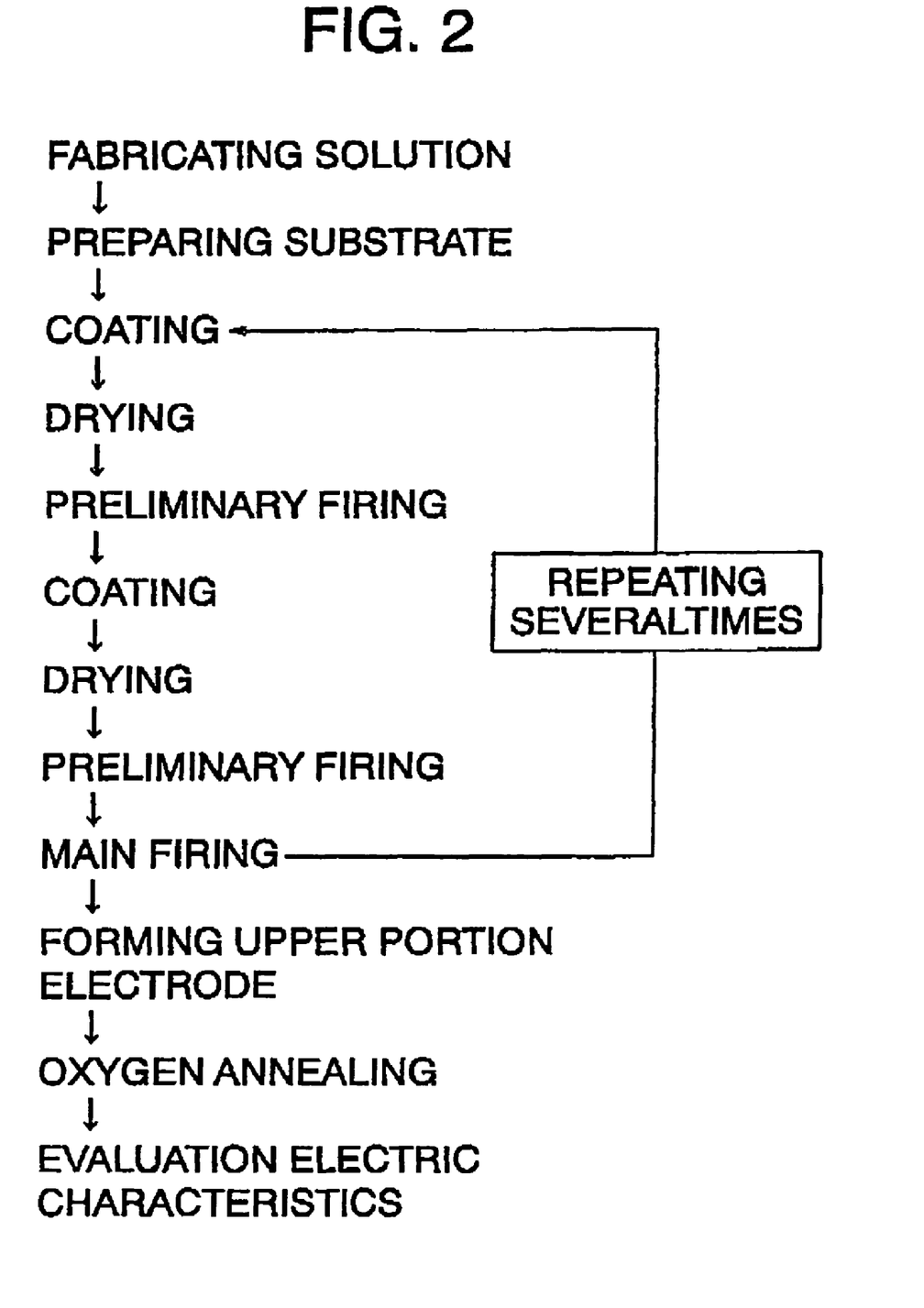
FIG. 2 is a flowchart showing the production steps of the thin film capacitor shown in FIG. 1.

As shown in FIG. 2, a material solution for forming the dielectric thin film 8 shown in FIG. 1 is fabricated first. When the dielectric thin film 8 is a bismuth layer compound, for example, expressed by a stoichiometric composition of $SrBi_4Ti_4O_{15}$ and being added an excessive quantity of bismuth, a toluene solution of 2-ethyl hexanoate Sr, a 2-ethyl hexanoate solution of 2-ethyl hexanoate Bi, and a toluene solution of 2-ethyl hexanoate Ti are prepared. Two of the solutions are mixed, so that the Bi adding quantity is increased by a mole comparing with that in the case of mixing them at the stoichiometric ratio, such as 1 mole of 2-ethyl hexanoate Sr, (4+α) moles of 2-ethyl hexanoate Bi and 4 moles of 2-ethyl hexanoate Ti, and the result is diluted by toluene, as a result, a material solution can be obtained.

Next, the material solution is applied on the lower portion electrode 6 shown in FIG. 1A. The coating method is not particularly limited and the spin-coating method, dip coating method, spray method and a method of painting with a brush, etc. may be used. For example, about 1 to 300 nm of a coating film can be formed by one-time coating. The coating film is dried in the air to evaporate a catalyst in the coating film as shown in FIG. 2. The drying temperature is from the room temperature to 400° C. or so.

Next, the coating film after drying is preliminarily fired (not to be crystallized) in an oxygen atmosphere. The preliminary firing temperature is 200 to 700° C. or so.

Next, as shown in FIG. 2, the steps from coating to preliminary firing are repeatedly performed on the coating film after preliminary firing for one time or more. Note that when a thickness of the coating film before firing is too thick, it is liable that a preferably crystallized c-axis oriented bismuth layer compound film is hard to be obtained.

After that, main firing (also, simply referred to as "firing") is performed on the coating film. The main firing is performed under a temperature condition of crystallizing the coating film, which is preferably 700 to 900° C. An atmosphere of the main firing is not particularly limited and may be an oxygen gas atmosphere.

Next, as shown in FIG. 2, the main firing after repeating steps from coating to preliminary firing was repeated for one or more times, so that a dielectric thin film 8 having a final thickness of 1 to 1000 nm or so can be obtained. At the time of the main firing, a thickness of the coating film before firing at one-time main firing is set, so that the film thickness after the one-time firing becomes preferably 200 nm or thinner, and more preferably 10 to 200 nm. When the thickness of the coating film before firing is too thick, it is liable that a preferably crystallized c-axis oriented bismuth layer compound film is hard to be obtained. While, when it is too thin, the main firing has to be repeated for many times to obtain a desired thickness of a dielectric thin film and it is not economical.

The thus obtained dielectric thin film 8 is composed of a bismuth layer compound including an excessive quantity of bismuth, and a c-axis thereof is oriented to be vertical with respect to the substrate 4. The c-axis orientation degree of the bismuth layer compound is preferably 80% or higher, more preferably 90% or higher and furthermore preferably 95% or higher.

After that, as shown in FIG. 1B, the upper electrode 10 is formed by the sputtering method, etc, and subjected to thermal treatment in $pO_2$=20 to 100%. The thermal treatment is performed preferably at 500 to 900° C.

The dielectric thin film 8 as above and a thin film capacitor 2 using the same have a relatively high permittivity, a low lose, excellent leakage resistance characteristics, improved breakdown voltage, excellent temperature characteristics of permittivity and excellent surface smoothness.

Also, the dielectric thin film 8 as above and the thin film capacitor 2 are also excellent in the frequency characteristics and voltage characteristics.

Second Embodiment

In the present embodiment, a thin film multilayer capacitor, wherein the dielectric thin film is formed by multilayer, will be explained as an example of a thin film capacitance element.

Figure 3:
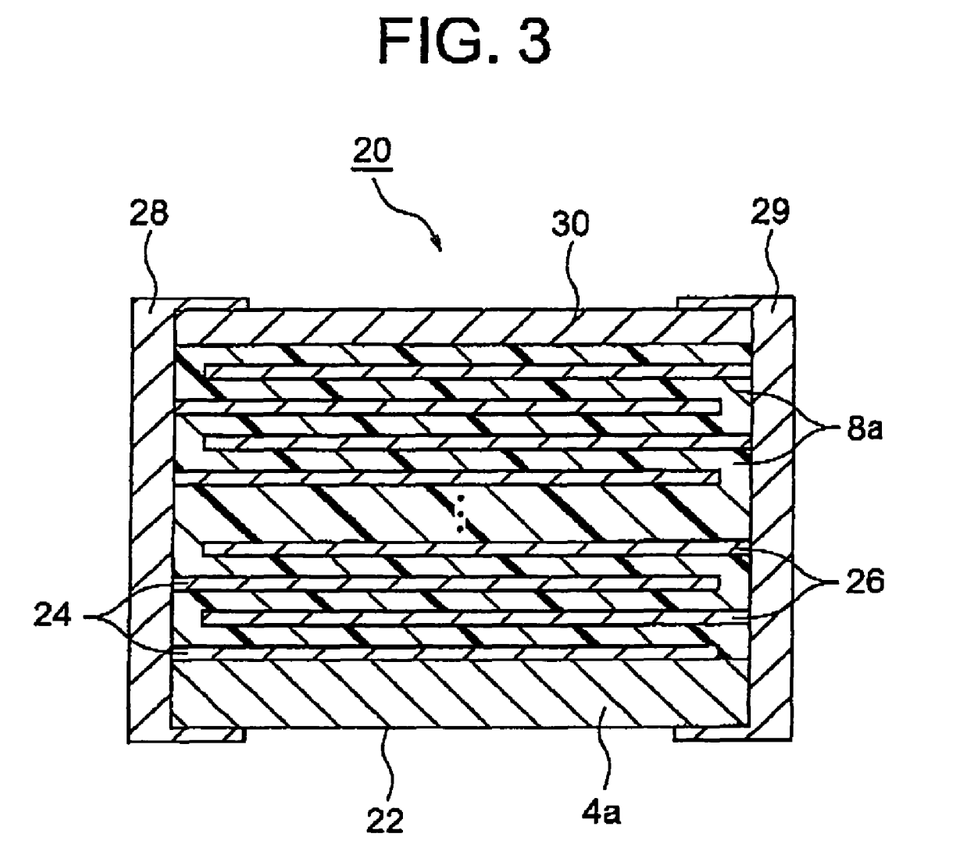
FIG. 3 is a schematic sectional view of a thin film multilayer capacitor according to another embodiment of the present invention.

As shown in FIG. 3, a thin film multilayer capacitor 20 according to an embodiment of the present invention has a capacitor element 22. The capacitor element 22 has a multi-layer structure, wherein a plurality of dielectric thin films 8a and internal electrode thin films 24 and 26 are alternately arranged on a substrate 4a and a protective layer 30 is formed to cover the outermost arranged dielectric thin film 8a. At both end portions of the capacitor element 22 are formed with a pair of external electrodes 28 and 29, and the pair of external electrodes 28 and 29 are electrically connected to exposed end surfaces of the plurality of internal electrode thin films 24 and 26 alternately arranged in the capacitor element 22 so as to configure a capacitor circuit. A shape of the capacitor element 22 is not particularly limited but normally a rectangular parallelepiped. Also, a size thereof is not particularly limited and, for example, a length (0.01 to 10 mm)×width (0.01 to 10 mm)×height (0.01 to 1 mm) or so.

The substrate 4a is formed by the same material as that of the substrate 4 in the first embodiment explained above. The dielectric thin film 8a is formed by the same material as that of the dielectric thin film 8 in the first embodiment explained above.

The internal electrode thin films 24 and 26 are formed by the same material as that of the lower portion electrode thin film 6 and the upper portion electrode thin film 10 in the first embodiment. A material of the external electrodes 28 and 29 is not particularly limited and composed of $CaRuO_3$, $SrRuO_3$ and other conductive oxide; Cu, a Cu alloy, Ni, a Ni alloy or other base metal; Pt, Ag, Pd, an Ag—Pd alloy and other precious metal; etc. A thickness thereof is not particularly limited and may be, for example, 10 to 1000 nm or so. A material of the protective layer 30 is not particularly limited and it may be composed of, for example, a silicon oxide film and an aluminum oxide film, etc.

In the thin film multilayer capacitor 20, after forming a first internal electrode thin film 24 on the substrate 4a by using a mask, such as a metal mask, the dielectric thin film 8a is formed on the internal electrode thin film 24, then, a second internal electrode thin film 26 is formed on the dielectric thin film 8a. After repeating such steps for a plurality of times, an outermost dielectric thin film 8a on the opposite side of the substrate 4a is covered with the protective film 30, so that the capacitor element 22, wherein a plurality of internal electrode thin films 24 and 26 and dielectric thin films 8a are alternately arranged on the substrate 4a, is formed. By covering with the protective film 30, an effect of moisture in the air on the inside of the capacitor element 22 can be suppressed. Also, when forming the external electrodes 28 and 29 on both end portions of the capacitor element 22 by dipping or sputtering, etc., internal electrode thin films 24 as odd layers are electrically connected to one of the external electrode 28, and internal electrode thin films 26 as even layers are electrically connected to the other external electrode 29, so that the thin film multilayer capacitor 20 is obtained, In the present embodiment, it is preferable to use a substrate 4a composed of an amorphous material in terms of reducing the production cost.

The dielectric thin film 8a used in the present embodiment exhibits a relatively high permittivity even when made to be thin and, moreover, has preferable surface smoothness, so that the number of stacked layers may be 20 or more, and preferably 50 or more. Therefore, a compact thin film multilayer capacitor 20 capable of giving a relatively high capacitance can be provided.

In the thin film capacitor 2 and thin film multilayer capacitor 20 according to the present embodiment as explained above, it is preferable that an average change rate ($\Delta\epsilon$) of the permittivity against temperature in a range or at least −55 to +150° C. is within ±500 ppm/° C. (the reference temperature is 25° C.), and more preferably within ±300 ppm/° C.

Next, the present invention will be explained further in detail by taking more specific examples of the embodiment of the present invention. Note that the present invention is not limited to the examples.

EXAMPLES

Example 1

As shown in FIG. 2, first, a material solution for forming the dielectric thin film 8 shown in FIG. 1 was fabricated. In the present embodiment, to compose the dielectric thin film 8 of a bismuth layer compound expressed by the composition formula of $SrBi_{4+\alpha}Ti_4O_{15}$ including an excessive quantity of bismuth than that in the bismuth layer compound expressed by the stoichiometric composition formula of $SrBi_4Ti_4O_{15}$ (SBTi) and the composition formula of $Bi_2A_{m-1}B_mO_{3m+3}$, wherein "m" is 4, "$A_3$" is $Sr+Bi_2$, and "$B_4$" is $Ti_4$, a solution described below was prepared.

First, a toluene solution of 2-ethyl hexanoate Sr, a 2-ethyl hexanoate solution of 2-ethyl hexanoate Bi, and a toluene solution of 2-ethyl hexanoate Ti were prepared as material solutions. Two of the solutions were mixed, so that the Bi adding quantity was increased by α mole comparing with that in the case of mixing them at the stoichiometric ratio, such as 1 mole of 2-ethyl hexanoate Sr, (4+α) moles of 2-ethyl hexanoate Bi and 4 moles of 2-ethyl hexanoate Ti, and the result was diluted by toluene, as a result, a material solution was obtained.

Some kinds of material solutions were prepared, wherein the "α" indicating an excessive content of Bi is changed to 0 (excessive Bi is 0 mol %: Bi/Ti=1), 0.4 (10 mol %: Bi/Ti=1.1), 0.8 (20 mol %: Bi/Ti=1.2), 1.2 (30 mol %: Bi/Ti=1.2), 1.6 (40 mol %: Bi/Ti=1.1) and 2.0 (50 mol %: Bi/Ti=1.5). These kinds of material solutions were diluted with toluene, so that $SrBi_4Ti_4O_{15}$ in the stoichiometric composition was included in the material solution at concentration of 0.1 mol/litter. Each of the material solutions was filtrated by a syringe filter having an aperture diameter of 0.2 μm made by PTFE in a clean room and put in a glass container cleaned in a clean room.

Also, the substrate 4 for producing the dielectric thin film 8 was prepared separately from the material solutions. The substrate 4 was a silicon single crystal (100) substrate, and an insulation layer 5 as a silicon oxide film was formed on a surface of the substrate 4 by thermal oxidization processing. A thickness of the insulation layer 5 was 0.5 μm. On a surface of the insulation layer 5, a lower portion electrode 6 formed by a Pt thin film was formed to be a thickness of 0.1 μm by the sputtering method. An area of the substrate 4 was 5 mm×10 mm.

The substrate 4 was prepared by the number of the kinds of the material solutions, and each of them was set to a spin coater. Each of the material solutions was added by 10μ litter on the surface of the lower portion electrode 6 of the substrate 4, and spin-coated under a condition of 4000 rpm and 20 seconds, so that a coating film was formed on the surface of the lower portion electrode 6. To evaporate a catalyst of each coating film, the substrate 4 was placed in a constant chamber (the inside is the air) set at 150° C. and dried for 10 minutes. After 10 minutes, the substrate 4 was taken out and, as shown in FIG. 1A, a part of the coating film for forming the dielectric thin film 8 was removed, so that a part of the surface of the lower portion electrode 6 is exposed.

Next, to perform preliminary firing on the coating film, each substrate 4 was placed in a ring furnace. In the ring furnace, oxygen was flowing at 0.3 litter/minute, the temperature was raised to 400° C. at the temperature rising rate of 10° K/minute, held at 400° C. for 10 minutes, then, the temperature was lowered at the temperature lowering rate of 10° K/minute. The preliminary firing was performed under a temperature condition of not crystallizing the coating film.

After that, on the preliminarily fired coating film, steps from the spin-coating to preliminary firing as above were repeated again by using the same kind of material solution.

Next, to perform main firing on the preliminarily fired film, each substrate was placed in a ring furnace. In the ring furnaces oxygen was flowing at 5 milliliter/minute, the temperature was raised to 850° C. at the temperature rising rate of 80° K/minute, held at 850° C. for 30 minutes, then, the temperature was lowered at the temperature lowering rate of 80° K/minute, so that a part of the dielectric thin film 8 was obtained. A thickness of the part of the dielectric thin film 8 after the main firing was about 100 nm.

After that, on the part of the dielectric thin film 8 after the main firing, as shown in FIG. 2, coating, drying, preliminary firing, coating, drying, preliminary firing and main firing explained above were performed for two times (three times in total), and a dielectric thin film 8 having a total film thickness of 300 nm was obtained finally.

When X-ray diffraction (XRD) measurement was made on the crystal structure of the dielectric thin film 8 corresponding to each material solution, it was confirmed to be oriented in the [001] direction, that is c-axis oriented being vertically with respect to the surface of the silicon single crystal substrate 4. Also, a c-axis orientation degree F (%) of each of the dielectric thin films was obtained. The c-axis orientation degree (%) was obtained from the measured XRD pattern by using the Lottgering method in a range of 10 to 35 degrees. The results are shown in Table 1.

Next, on a surface of each of the dielectric thin films 8, as shown in FIG. 1B, a Pt upper portion electrode 10 having 0.1 mmø was formed by the sputtering method, so that a plurality of kinds of thin film capacitor samples were produced.

Electric characteristics (a permittivity and leakage current) and temperature characteristics of permittivity of the obtained capacitor samples were evaluated.

The permittivity (no unit) was calculated for each capacitor sample from a capacitance measured under a condition at a measurement frequency of 100 kHz (AC 20 mV) at the room temperature (25° C.) by using an impedance analyzer (HP4194A), and an electrode size and distance between electrodes of the capacitor sample.

The leakage current characteristics (unit: $A/cm^2$) was measured at an electric field intensity of 50 kV/cm.

The temperature characteristics of the permittivity was obtained by measuring a permittivity of each capacitor sample under the above condition, obtaining an average change rate (Δε) of the permittivity against a temperature in a range of −55 to +150° C. when assuming that the reference temperature was 25° C., and calculating a temperature coefficient (ppm/° C.).

The results are shown in Table 1.

TABLE 1

| | Bi Excessive Content (mol %) | Bi/Ti | Bi Excessive Content ($\alpha$) | Firing Temperature (° C.) | Film Orientation Direction | c-axis Orientation Degree (%) | Leakage Current (A/cm$^2$) | Permittivity (100 kHz) | Temperature Coefficient (ppm/° C.) |
|---|---|---|---|---|---|---|---|---|---|
| Example 1 | 0  | 1   | 0   | 850 | [001] | 30 | $5 \times 10^{-6}$ | 225 | 850  |
| Example 1 | 10 | 1.1 | 0.4 | 850 | [001] | 91 | $1 \times 10^{-7}$ | 210 | 100  |
| Example 1 | 20 | 1.2 | 0.8 | 850 | [001] | 95 | $1 \times 10^{-8}$ | 200 | -90  |
| Example 1 | 30 | 1.3 | 1.2 | 850 | [001] | 97 | $1 \times 10^{-8}$ | 183 | -100 |
| Example 1 | 40 | 1.4 | 1.6 | 850 | [001] | 98 | $1 \times 10^{-8}$ | 150 | -100 |
| Example 1 | 50 | 1.5 | 2   | 850 | [001] | 70 | $5 \times 10^{-6}$ | 150 | 700  |

As shown in Table 1, it was confirmed that the c-axis orientation improved, leakage current became less, and leakage resistant property became excellent when "a" indicating the excessive content of Bi was in a range of $0<\alpha<2.0$, preferably $0.1 \leq \alpha < 2.0$, more preferably, $0.4 \leq \alpha < 2.0$, and particularly preferably $0.4 \leq \alpha \leq 1.6$.

Also, it was confirmed that when expressing the excessive content of Bi by the mole ratio against Ti (Bi/Ti), the c-axis orientation improved, leakage current became less, and leakage resistant property became excellent when Bi/Ti was in a range of $1<\text{Bi/Ti}<1.5$, preferably $1.1 \leq \text{Bi/Ti} < 1.5$, more preferably $1.2 \leq \text{Bi/Ti} < 1.5$, and particularly preferably $1.2 \leq \text{Bi/Ti} \leq 1.4$.

Also, since the "$\alpha$" corresponds to $0.5 \times m$ (m=4 in the example 1), it is expected that the c-axis orientation improves, leakage current becomes less, and leakage resistant property becomes excellent when the excessive content of Bi is in a range of $0 < \text{Bi} < 0.5 \times m$ mol, preferably $0.1 \leq \text{Bi} < 0.5 \times m$ mol, more preferably $0.4 \leq \text{Bi} < 0.5 \times m$ mol, and particularly preferably $0.4 \leq \text{Bi} \leq 0.4 \times m$ mol in terms of Bi also in other bismuth layer compounds.

Example 2

Other than fixing Bi/Ti indicating the excessive quantity of bismuth to 1.2 and changing the holding temperature at main firing from 650 to 950° C., capacitor samples having dielectric thin films 8 were produced in the same way as in the example 1, and the same tests as in the example 1 were conducted. The results are shown in Table 2.

As shown in Table 2, it was confirmed that the c-axis orientation improved and leakage resistant property became excellent when the temperature at the main firing was preferably 700 to 900° C., and more preferably 800 to 900° C.

Example 3

In the present example, frequency characteristics and voltage characteristics were evaluated by using the thin film capacitor samples produced in the example 1.

Figure 4:
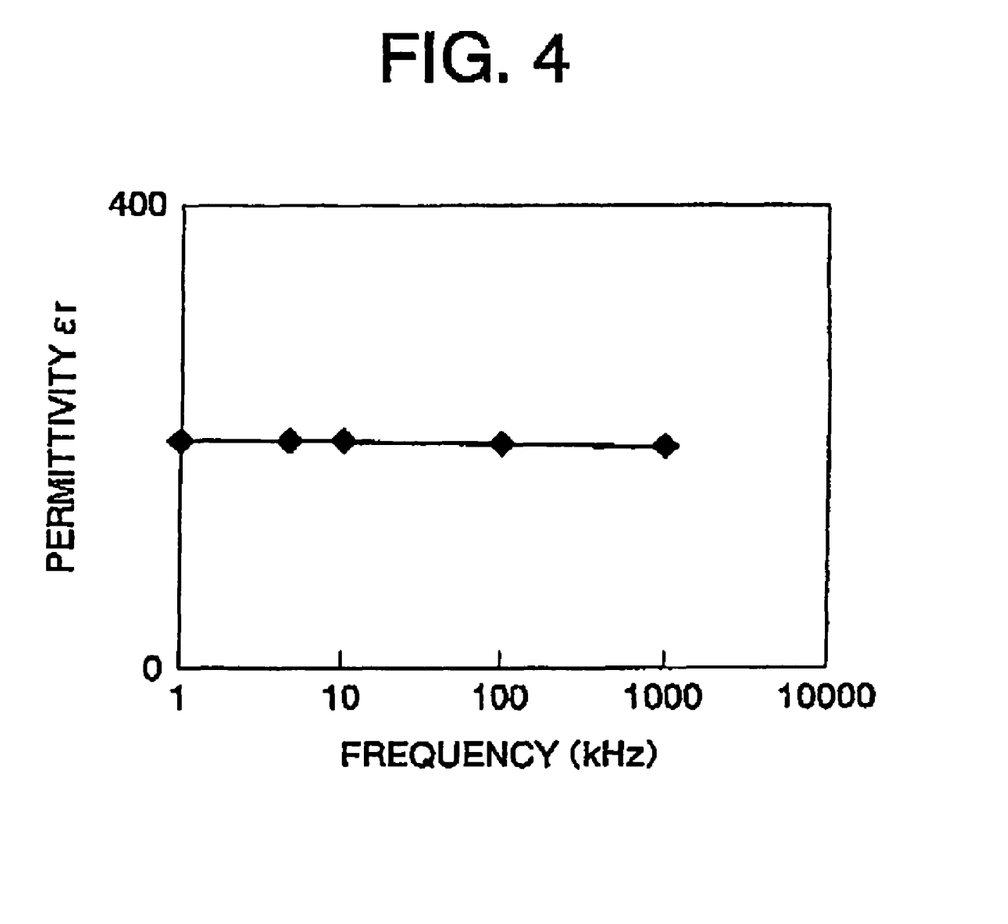
FIG. 4 is a graph showing frequency characteristics of a dielectric thin film of a thin film capacitor according to an embodiment of the present invention.

The frequency characteristics were evaluated as below. By changing a frequency from 1 kHz to 1 MHz at the room temperature (25° C.), the capacitance was measured on each capacitor sample, and a result of calculating the permittivity was shown in FIG. 4. An impedance analyzer (HP4194A) was used for measuring the capacitance. As shown in FIG. 4, it was confirmed that the permittivity value does not change even if the frequency was changed to 1 MHz under a specific temperature. Namely, the frequency characteristics were confirmed to be excellent.

Figure 5:
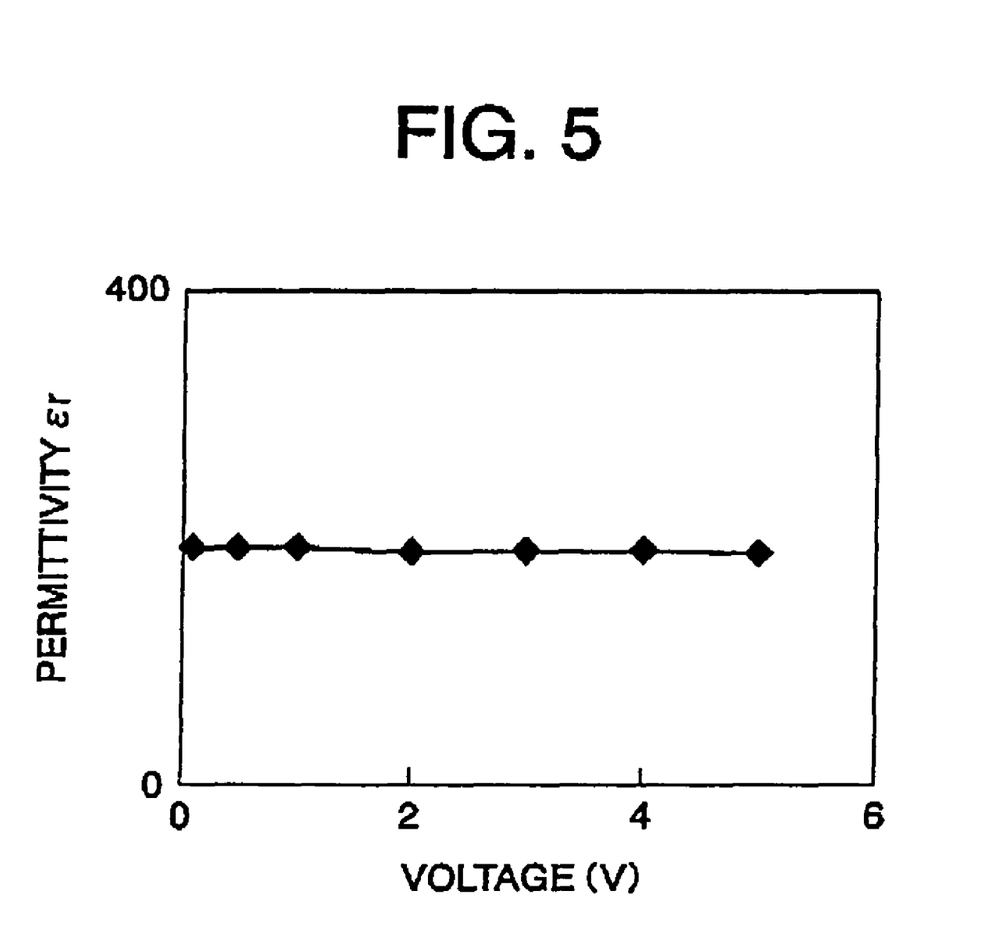
FIG. 5 is a graph showing voltage characteristics of the dielectric thin film of the thin film capacitor according to an embodiment of the present invention.

The voltage characteristics were evaluated as below. For each capacitor sample, a measurement voltage (application voltage) was changed from 0.1V (electric field intensity of 5 kV/cm) to 5V (electric field intensity of 250 kV/cm) under a specific frequency (100 kHz), a capacitance under a specific voltage was measured (the measurement temperature was 25° C.), and a result of calculating the permittivity was shown in FIG. 5. An impedance analyzer (HP4194A) was used for measuring the capacitance. As shown in FIG. 5, it was confirmed that the permittivity value does not change even if the measurement voltage was changed to 5V under a specific frequency. Namely, the voltage characteristics were confirmed to be excellent.

TABLE 2

| | Bi Excessive Content (mol %) | Bi/Ti | Bi Excessive Content ($\alpha$) | Firing Temperature (° C.) | Film Orientation Direction | c-axis Orientation Degree (%) | Leakage Current (A/cm$^2$) | Permittivity | Temperature Coefficient (ppm/° C.) |
|---|---|---|---|---|---|---|---|---|---|
| Example 2 | 20 | 1.2 | 0.8 | 650 | [001] | —  | $5 \times 10^{-4}$ | —   | —   |
| Example 2 | 20 | 1.2 | 0.8 | 700 | [001] | 80 | $1 \times 10^{-7}$ | 180 | 350 |
| Example 2 | 20 | 1.2 | 0.8 | 750 | [001] | 86 | $1 \times 10^{-8}$ | 190 | 300 |
| Example 2 | 20 | 1.2 | 0.8 | 800 | [001] | 86 | $1 \times 10^{-8}$ | 190 | 200 |
| Example 2 | 20 | 1.2 | 0.8 | 850 | [001] | 95 | $1 \times 10^{-8}$ | 200 | -90 |
| Example 2 | 20 | 1.2 | 0.8 | 900 | [001] | 91 | $1 \times 10^{-8}$ | 196 | 100 |
| Example 2 | 20 | 1.2 | 0.8 | 950 | [001] | 90 | $5 \times 10^{-6}$ | 190 | 120 |

Example 4

Other than changing the repeating time from coating to preliminary firing before performing one-time main firing, a film thickness before the one-time main firing and the times of the main firing to those shown in Table 3 in the steps shown in FIG. 2, capacitor samples having dielectric thin films 8 were produced in the same way as in the example 1, and the same tests as those in the example 1 were conducted. The results are shown in Table 3.

TABLE 3

| | Bi Excessive Content (mol %) | Bi/Ti | Bi Excessive Content ($\alpha$) | Times of Preliminary Firing Before One-time Main Firing | Film Thickness (nm) Before One-time Main Firing | Times of Main Firing |
|---|---|---|---|---|---|---|
| Example 4 | 10 | 1.1 | 0.4 | Once | 50 | Six times |
| Example 4 | 10 | 1.1 | 0.4 | Once | 100 | Three times |
| Example 4 | 10 | 1.1 | 0.4 | Twice | 200 | Twice |
| Example 4 | 10 | 1.1 | 0.4 | Three times | 300 | Once |

| | Total Film Thickness (nm) | Firing Temperature (° C.) | c-axis Orientation Degree (%) | Leakage Current (A/cm$^2$) | Permittivity (100 kHz) | Temperature Coefficient (ppm/° C.) |
|---|---|---|---|---|---|---|
| Example 4 | 300 | 850 | 80 | $1 \times 10^{-7}$ | 200 | 300 |
| Example 4 | 300 | 850 | 91 | $1 \times 10^{-6}$ | 210 | 100 |
| Example 4 | 400 | 850 | 85 | $1 \times 10^{-6}$ | 210 | 290 |
| Example 4 | 300 | 850 | 64 | $8 \times 10^{-6}$ | 228 | 760 |

As shown in Table 3, it was confirmed that the c-axis orientation degree improved as a result of repeating the coating, drying and/or preliminary firing so as to attain 200 nm or thinner, preferably 10 to 200 nm in the film thickness of the coating film before firing.

As explained above, according to the present invention, it is possible to provide a thin film capacitance element composition, high permittivity insulation film, thin film capacitance element, thin film multilayer capacitor and a production method of the thin film capacitance element, wherein the c-axis orientation degree is high and particularly the leakage current resistance characteristic is excellent. Also, in the present invention, particularly by forming by a solution method, a dielectric thin film of a thin film capacitance element having a high c-axis orientation degree and excellent leakage current resistance characteristic can be easily produced.

The invention claimed is:

1. A thin film capacitance element, comprising a lower portion electrode, a dielectric thin film including a bismuth layer compound having a c-axis oriented vertically with respect to a substrate surface, and an upper portion electrode are successively formed on the substrate, wherein:
   the bismuth layer compound is composed of a thin film capacitance element composition;
   the bismuth layer compound is expressed by a composition formula of $(Bi_2O_2)^{2+}(A_{m-1}B_mO_{3m+1})^{2-}$ or $Bi_2A_{m-1}B_mO_{3m+3}$, wherein:
   "m" is an even number,
   "A" is at least one element selected from Na, K, Pb, Ba, Sr, Ca and Bi, and
   "B" is at least one element selected from Fe, Co, Cr, Ga, Ti, Nb, Ta, Sb, V, Mo and W;
   Bi in said bismuth layer compound is excessively included with respect to said composition formula of $(Bi_2O_2)^{2+}(A_{m-1}B_mO_{3m+1})^{2-}$ or $Bi_2A_{m-1}B_mO_{3m+3}$, and the excessive content of Bi is in a range of 0<Bi<0.5×m mol in terms of Bi;
   a c-axis orientation degree of the bismuth layer compound is 80% or higher; and
   the lower portion electrode is oriented in a [100] direction.

2. The thin film capacitance element set forth in claim 1, wherein the excessive content of Bi in the dielectric thin film is in a range of 0.4≦Bi<0.5×m mol in terms of Bi.

3. The thin film capacitance element as set forth in claim 1, the thin film capacitance element composition further comprising at least one rare earth element selected from the group consisting of Sc, Y, La, Ce, Pr, Nd, Pm, Sm, Eu, Gd, Tb, Dy, Ho, Er, Tm, Yb and Lu.

4. The thin film capacitance element as set forth in claim 1, wherein leakage current density at electric field intensity of 50 kV/cm is $1 \times 10^{-7}$ A/cm$^2$ or lower.

5. The thin film capacitance element set forth in claim 1, wherein an average change rate of a capacitance against a temperature in a range of −55 to +150° C. is ±500 ppm/° C. with the reference temperature of 25° C.

6. The thin film capacitance element as set forth in claim 1, wherein a thickness of said dielectric thin film is 1 to 1000 nm.

7. The thin film capacitance element as set forth in claim 1, wherein the lower portion electrode comprises a conductive oxide or precious metal.

8. The thin film capacitance element as set forth in claim 1, wherein the lower portion electrode comprises CaRuO$_3$, SrRuO$_3$, Pt, or Ru.

9. A thin film capacitance element, comprising a lower portion electrode, a dielectric thin film including a bismuth layer compound having a c-axis oriented vertically with respect to a substrate surface, and an upper portion electrode are successively formed on the substrate, wherein:
   the bismuth layer compound is composed of a thin film capacitance element composition;
   the bismuth layer compound is expressed by a composition formula of SrBi$_4$Ti$_4$O$_{15}$;
   Bi in the bismuth layer compound is excessively included with respect to said composition formula of SrBi$_4$Ti$_4$O$_{15}$, and the excessive content of Bi is in a range of 0<Bi<2.0 mol in terms of Bi;
   a c-axis orientation degree of the bismuth layer compound is 80% or higher; and
   the lower portion electrode is oriented in a [100] direction.

10. A thin film capacitance element, comprising a lower portion electrode, a dielectric thin film including a bismuth layer compound having a c-axis oriented vertically with respect to a substrate surface, and an upper portion electrode are successively formed on the substrate, wherein:
- the bismuth layer compound is composed of a thin film capacitance element composition;
- the bismuth layer compound is expressed by a composition formula of $SrBi_4Ti_4O_{15}$;
- Bi in the bismuth layer compound is excessively included with respect to said composition formula of $SrBi_4Ti_4O_{15}$, and when the excessive content of Bi is expressed by a mole ratio (Bi/Ti) against Ti, Bi/Ti is in a range of $1<Bi/Ti<1.5$;
- a c-axis orientation degree of the bismuth layer compound is 80% or higher; and
- the lower portion electrode is oriented in a [100] direction.

11. A thin film capacitance element, comprising a lower portion electrode, a dielectric thin film including a bismuth layer compound having a c-axis oriented vertically with respect to a substrate surface, and an upper portion electrode are successively formed on the substrate, wherein:
- the bismuth layer compound is composed of a thin film capacitance element composition;
- the bismuth layer compound is expressed by a composition formula of $Sr_xCa_yBa_zBi_4Ti_4O_{16}$, $x+y+z=1$, $0 \leq x \leq 1$, $0 \leq y \leq$, and $0 \leq z \leq 1$; and
- Bi in the bismuth layer compound is excessively included with respect to said composition formula of $Sr_xCa_yBa_zBi_4Ti_4O_{15}$, and when the excessive content of Bi is expressed by a mole ratio (Bi/Ti) against Ti, Bi/Ti is in a range of $1<Bi/Ti<1.5$;
- a c-axis orientation degree of the bismuth layer compound is 80% or higher; and
- the lower portion electrode is oriented in a [100] direction.

12. A thin film multilayer capacitor, comprising a plurality of dielectric thin films comprising a bismuth layer compound having a c-axis oriented vertically with respect to a substrate surface and internal electrode thin films alternately stacked on a substrate, wherein:
- the bismuth layer compound is composed of a thin film capacitance element composition;
- the bismuth layer compound is expressed by a composition formula of $(Bi_2O_2)^{2+}(A_{m-1}B_mO_{3m+1})^{2-}$ or $Bi_2A_{m-1}B_mO_{3m+3}$, wherein:
  - "m" is an even number,
  - "A" is at least one element selected from Na, K, Pb, Ba, Sr, Ca, and Bi, and
  - "B" is at least one element selected from Fe, Co, Cr, Ga, Ti, Nb, Ta, Sb, V, Mo and W;
- Bi in said bismuth layer compound is excessively included with respect to said composition formula of $(Bi_2O_2)^{2+}(A_{m-1}B_mO_{3m+1})^{2-}$ or $Bi_2A_{m-1}B_mO_{3m+3}$, and the excessive content of Bi is in a range of $0<Bi<0.5 \times m$ mol in terms of Bi;
- a c-axis orientation degree of the bismuth layer compound is 80% or higher; and
- the internal electrode thin films are oriented in a [100] direction.

13. The thin film multilayer capacitor as set forth in claim 12, wherein a thickness of said dielectric thin film is 1 to 1000 nm.

* * * * *